United States Patent [19]

Ohga et al.

[11] Patent Number: 4,834,245

[45] Date of Patent: May 30, 1989

[54] POUCH HAVING TEARING ZONE FOR TAKING OUT CONTENT PACKED THEREIN

[75] Inventors: Toshinari Ohga; Raizo Kuge; Susumu Niwa, all of Tokyo, Japan

[73] Assignee: Kabushiki Kaisha Hosokawa Yoko, Tokyo, Japan

[21] Appl. No.: 228,740

[22] Filed: Aug. 5, 1988

[51] Int. Cl.$^4$ .................. B65D 65/36; B65D 75/60; B65D 77/38

[52] U.S. Cl. .................. 206/610; 206/618; 206/632; 206/604

[58] Field of Search ............ 206/610, 618, 631, 632, 206/633, 484, 604; 383/908

[56] References Cited

U.S. PATENT DOCUMENTS

| | | | |
|---|---|---|---|
| 2,329,360 | 9/1943 | Salisberg | 206/484 |
| 3,276,669 | 10/1966 | Vilutis | 206/631 |
| 3,547,257 | 12/1970 | Armentrout | 206/632 |
| 3,572,579 | 3/1971 | Mueller | 206/633 |
| 4,236,652 | 12/1980 | Beguhn | 206/484 |
| 4,386,705 | 6/1983 | Mueller | 206/609 |
| 4,539,793 | 9/1985 | Malek | 206/632 |
| 4,638,913 | 1/1987 | Howe, Jr. | 206/632 |
| 4,658,963 | 4/1987 | Jud | 206/632 |
| 4,670,352 | 6/1987 | Kurz | 206/604 |
| 4,720,011 | 1/1988 | Canamero | 206/610 |
| 4,747,510 | 5/1988 | Mack | 206/519 |

Primary Examiner—David T. Fidei
Attorney, Agent, or Firm—Oliff & Berridge

[57] ABSTRACT

A pouch for containing therein a content including front and rear pouch bodies formed of a laminated film, and heat-sealed portions at confronting side edge portions of the front and rear pouch bodies for providing a fluid tight structure of the pouch. The pouch is characterized in that: the laminate film includes uniaxial oriented plastic film layer provided with molecular orientation in one direction, and at least two notches are formed at positions close to each other at least one of the heat-sealed portions for defining a leading end portion of a tearing zone. The notches are directed in a tearing direction parallel with a direction of the molecular orientation of the laminated film.

4 Claims, 3 Drawing Sheets

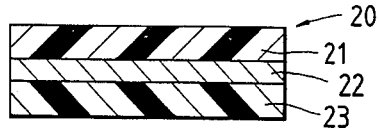
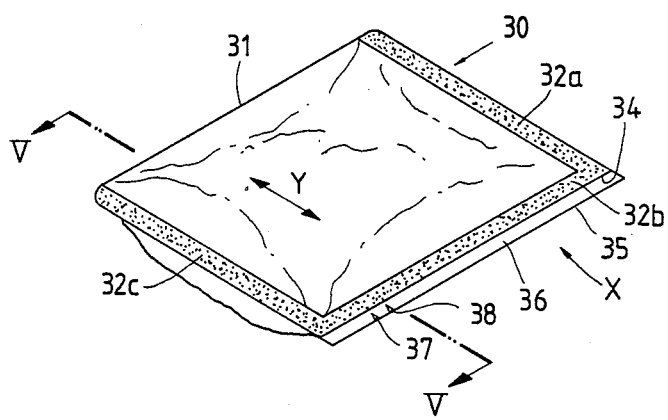
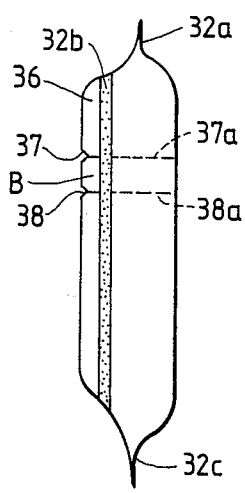
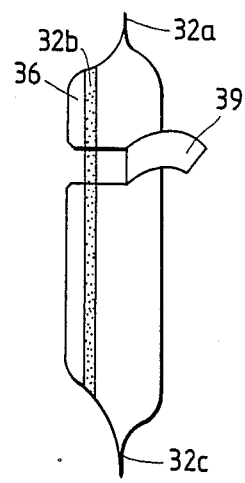

POUCH HAVING TEARING ZONE FOR TAKING OUT CONTENT PACKED THEREIN

BACKGROUND OF THE INVENTION

The present invention relates to a pouch or sack for packing a material therein, and more particularly, to the pouch having a tearing zone for taking out the material packed therein.

A composite film is generally available as a material of a sack or pouch. The composite film includes a polyethylene film laminated on an ordinary cellophane sheet or paper. The composite film having a rectangular shape is folded and confronting side edge portions are heat-sealed together so as to provide fluid-tight pouch. Alternatively, two composite films having shapes identical with each other are overlapped with each other, and confronting four side edge portions are heat-sealed together. When the pouch or the sack formed of such laminated film is required to be opened, a heat-sealed portion of the pouch can be manually torn, i.e., a user can manually break the seal at the heat-sealed portion. Such type of pouch is widely used.

Another type of pouch 1 formed of plastic laminated film is shown in FIG. 1 so as to improve fracture strength and moisture resistivity, so that fluidized content such as cooked food can be sealingly packed therein. However, the plastic laminated film provides relatively high tearing strength, and therefore, it would be rather difficult to manually tear the pouch at a heat-sealed portion 2 to take out the material.

In order to solve this problem, v-shaped or I-shaped notch 3 is formed at the heat-seal portion 2 so as to concentrate tearing force thereat and to propergate the force along the tearing direction A. In this case, if the content is not fully packed in the pouch, the user can hold only the films of the pouch, and it can be easily torn along the direction A. However, if the content is fully packed in the internal space of the pouch 1, such content may interrupt the tearing action. For example, if the content may be the frozon food fully packed in the pouch, the user cannot easily tear the pouch along the direction A, since the solidified content may interfere with the manual tearing action.

Still another type of a pouch 10 is shown in FIG. 2. The pouch 10 is formed of a cellophane or polypropylene film to pack therein a content such as a cigarette case 11. According to this type, the case 11 is fully occupied in the internal space of the pouch 10. However, there is provided a tearing zone 12 along which the pouch 10 can be easily torn for taking out the content. In the tearing zone 12, a tape 12a is bonded to the inner surface of a sheet 10a of the pouch 10, and the tearing zone 12 is defined by the internal tape 12a and a part 12b of the sheet 10a. Tensile strength of the tape 12a is higher than that of the pouch material 10a, so that when a leading end 12c of the tearing zone 12 is manually held and the user pulls up the leading end 12c, the pouch can be torn along the tearing zone 12 as shown by a dotted-chain line in FIG. 2. If required, additional tape-like film (not shown) is provided at inner side of the tape 12a so as to sandwich the same between the outer sheet 10a and the innermost additional tape-like film.

According to this conventional structure, even if the content is fully packed in the pouch 10, the user can easily open the pouch without being interfered with by the content. However, this latter type of pouch has disadvantages in that it would be rather difficult to manufacture the pouch, since an intricate tape bonding step is required prior to making the three dimensional pouch, and sufficient strength of the sheet 10a is not obtainable, since its strength must be lower than that of the internal tape 12a. Further, if a difference in tensile strength is not provided between the tape 12a and the sheet 10a, then slits or minute perforations must be formed at the sheet 10a so as to pull up the tearing zone 12 along the slits in the direction shown by the one-dotted line, which in turn, degrades sealability. Furthermore, if the inner tape 12a is accidentally cut during tearing, further opening is not be easily achievable.

SUMMARY OF THE INVENTION

It is therefore, an object of the present invention to overcome the above-described prior art drawbacks and disadvantages, and to provide an improved pouch having excellent tearing function regardless of the condition and amount of the content packed in the pouch.

Another object of this invention is to provide such pouch capable of providing sufficient sealability and facilitating tearing along a tearing zone.

Briefly, and in accordance with the present invention, there is provided a pouch for containing therein a content, including front and rear pouch bodies formed of a laminated film, and heat-sealed portions at confronting side edge portions of the front and rear pouch bodies for providing a fluid tight structure of the pouch. The improvement of the pouch is characterized in that: the laminate film is provided with molecular orientation in one direction, and at least two notches are formed at positions close to each other at at least one of the heat-sealed portions for defining a leading end portion of a tearing zone. The notches are directed in a tearing direction which is in parallel with a direction of the molecular orientation of the laminated film.

Since the composite laminate film has the molecular orientation in one direction, and the resultant pouch is torn in the direction parallel with the molecular orientation, the pouch is easily tearable. Further, since at least two notches are formed at positions close to each other at at least one of the heat-sealed portions, and since the notches are directed in parallel with the direction of the moleuclar orientation, a portion defined between the two notches serves as a leading end portion of the tearing zone, and the pouch can be torn by manually pulling up the leading end, so that a tape-like tearable zone is easily separable from the remaining pouch body.

BRIEF DESCRIPTION OF THE DRAWINGS

In the drawings;

FIG. 3 is a cross-sectional view showing a laminate film used in a pouch according to this invention;

FIG. 4 is a perspective view showing a pouch according to a first embodiment of this invention;

FIG. 5 is a cross-sectional view taken along the line V—V of FIG. 4;

FIG. 6(a) shows a side view as viewed from a direction indicated by an arrow X in FIG. 4;

FIG. 6(b) shows a side view showing tearing state according to the first embodiment;

DETAILED DESCRIPTION OF THE PREFERRED EMBODIMENTS

Figure 1:
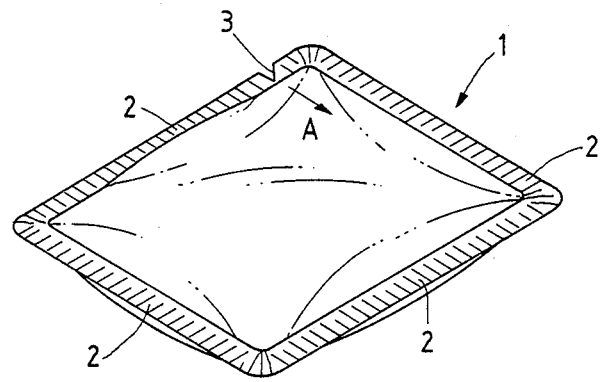
FIG. 1 is a perspective view showing a conventional pouch.
Figure 2:
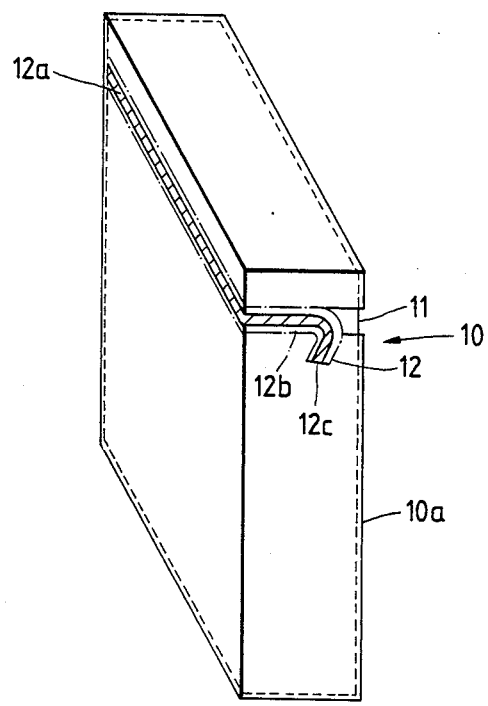
FIG. 2 is a perspective view showing a pouch according to another type of a conventional pouch.

A laminate film used as a material of a pouch according to this invention will first be described with reference to FIG. 3. The laminate film 20 includes a polypropylene film layer 21 having a thickness of 25 microns, aluminum film layer 22 having a thickness of 400 to 600 angstroms, and a heat-sealable polypropylene film layer 23 having a thickness of 20 microns. The film 21 serves as an outermost layer, and the film 23 serves as an innermost layer. The film 21 is sub-biaxial oriented film in which high linear molecular orientation in one direction is provided whereas molecular orientation in another direction perpendicular to the one direction is extremely low. This higher side molecular orientation is directed in parallel with a tearing direction (described later) with respect to a resultant pouch for facilitating tearing. The aluminum film 22 is deposited onto the film 23, and the composite films 22 and 23 are subjected to dry-bond lamination to the film 21 through an adhesive. Incidentally, the film 23 may include dual layers consisting of an oriented polypropylene layer and a casted polypropylene layer. In this case, the aluminum film 22 is deposited onto the oriented polypropylene layer.

Alternatively, the laminate film 20 includes a uniaxial polyethylene layer 21 having a thickness of 25 microns, the aluminum film layer 22 and a casted polypropylene film layer 23 having a thickness of 20 microns. The film 21 is subjected to dry-bond lamination to the aluminum film 22.

Further alternatively, the composite laminate film may consist of a casted polypropylene film layer having thickness of 25 microns, a uniaxial oriented polyethylene film layer having a thickness of 25 microns, and a casted polypropylene film layer having a thickness of 25 microns.

A pouch 30 according to a first embodiment will next be described with reference to FIGS. 4 thru 6(b). The pouch 30 has a single folded edge line 31 and three heat sealed edge portions 32a, 32b and 32c. This structure is a so called pillow type pouch. In one of the heat-sealed side edge portions 32b which directs in parallel with the fold edge line 31, side edge lines 34 and 35 are not completely aligned with each other, but are offset from each other in parallel so as to provide a single non-heat sealed area 36. In this exposed area 36, a pair of notches 37 and 38 having v-shape or I-shape are formed at positions close to each other, so that a finger gripping area B (which is a leading end of the tearing zone) at the area 36 is defined between the notches 37 and 38.

When a user manually grips the area B and pulls up the area B, the pouch 30 is opened along the lines 37a and 38a, so that a tearing zone 39 is easily separated from the remaining part of the pouch as shown in FIG. 6(b). It should be noted that the molecular orientation of the film is directed in the tearing direction 37a and 38a. Accordingly, even if the pouch fully contains materials therein, the pouch is easily tearable along the tearing zone 39 because of the formation of the two notches 37 and 38 and of the molecular orientation identical with the tearing direction.

Figure 7:
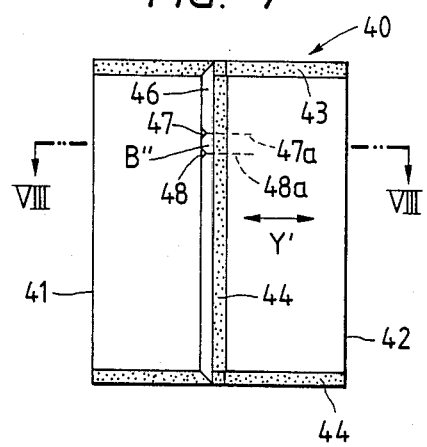
FIG. 7 is a rear view of a pouch according to a second embodiment of this invention.
Figure 8:
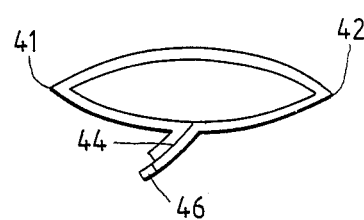
FIG. 8 is a cross-sectional view taken along the line VIII—VIII of FIG. 7.

A second embodiment of this invention will next be described with reference to FIGS. 7 and 8. In the second embodiment, a pouch 40 has two folded side edges 41 and 42 directed in parallel, and upper and lower heat seal seal edge portions 43 and 44 directed in parallel with each other, and a central heat seal portion 44 at a rear surface of the pouch 40. Similar to the first embodiment, there is non-overlapped portion 46 at which a pair of notches 47 and 48 are formed at positions close to each other, so that finger gripped portion B' (leading end of the tearable zone) is defined between the notches 47 and 48 and on the non-overlapped portion 46. In this embodiment, the tearing zone is also defined between the notches 47 and 48 and lines 47a and 48a contiguous with these notches. The tearing zone is directed in parallel with the direction of the molcular orientation as indicated by an arrow Y'.

Figure 9:
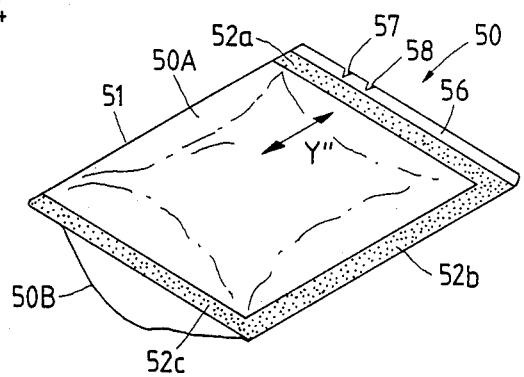
FIG. 9 is a perspective view showing a pouch according to a third embodiment of this invention.
Figure 10A:
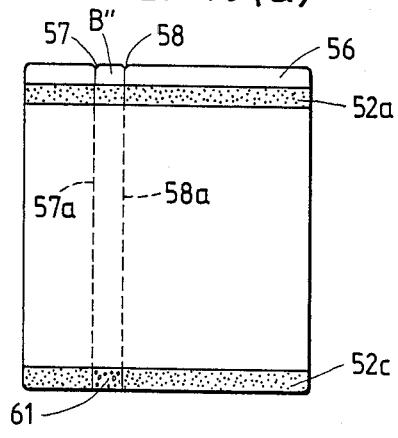
FIG. 10(a) is a front view of the pouch shown in FIG. 9.
Figure 10B:
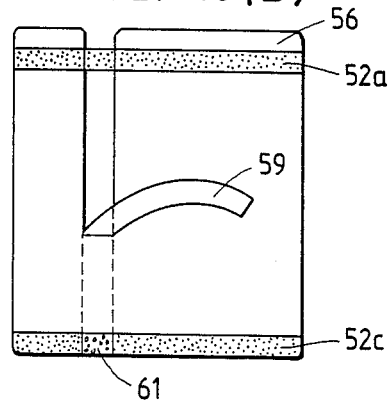
FIG. 10(b) is a front view showing the pouch tearing state.

A third embodiment according to this invention is shown in FIGS. 9 thru 10(b). A pouch 50 in this embodiment has a front and rear surfaces 50A and 50B and has a single folding edge 51 and three heat-sealed edge portions 52a, 52b and 52c. One of the heat-sealed edge portions 52a directed perpendicular to the folding edge line 51 has a surplus non-heat sealed area 56 at which a pair of notches 57 and 58 are formed. Between the notches 57 and 58 and on the non-heat sealed area 56, a finger gripping portion B'' is defined. As shown in FIGS. 10(a) and 10(b), when the portion B'' is manually gripped and pulled up, a tearing zone 59 is separated along the lines 57a and 58a. It goes without saying that the direction of the molecular orientation is in parallel with the tearing direction Y''.

At the other heat-sealed portion 52c directed in parallel with the above mentioned heat-sealed portion 52a, there is a weak bonding portion 61. The tearing zone 59 reaching to the heat-sealed portion 52c can be further separated from the remaining part of the heat sealed portion 52c because of the weak bonding. This weak bonding can be provided by mechanical treatment, or by addtionally forming a coating layer between the confronting heat sealed portions 52c so as to facilitate smooth separation thereat. Alternatively, if one surface tearing, for example, the front surface 50A tearing, is merely contemplated, it is unnecessary to provide the weak bonding portion 61.

The above mentioned notches are directed in a direction parallel with the direction of the molecular orientation of the composite film, so that when the leading end portion defined between the notches are pulled up, the subsequent pouch body can be easily torn in a tape-like manner whose tape width is equal to the distance between the notches.

In the foregoing embodiments, the pouch has three heat sealed portions. However, other types of pouches having four heat-sealed portions at its sides, or gassette type pouches are also available in the present invention.

In view of the foregoing, according to the present invention, since the composite laminate film has the molecular orientation in one direction, and the resultant pouch is torn in the direction parallel with the molecular orientation, and since two notches positioned close to each other are provided at least at one of the heat sealed portions for providing the manual gripping portion which serves as the leading end of the tearable zone, the pouch can be easily torn even if the content is fully packed in the pouch without any formation of slits or perforations at the laminate film of the pouch body.

While the invention has been described in detail and with reference to specific embodiments thereof, it would be apparent for those skilled in the art that various changes and modifications can be made therein without departing from the spirit and scope of the invention.

What is claimed is:

1. A pouch for containing therein a content, including front and rear pouch bodies formed of a laminated film, and heat-sealed portions at confronting side edge portions of said front and rear pouch bodies for providing a fluid tight structure of said pouch, characterized in that:

said laminate film is provided with molecular orientation in one direction, and at least two notches are formed at positions close to each other at at least one of said heat-sealed portions for defining a leading end portion of a tearing zone, said notches being directed in a tearing direction parallel with a direction of said molecular orientation of said laminated film, said laminated film comprising a sub-biaxial oriented polypropylene film layer serving as an outer surface of said pouch, an aluminum film layer and a heat-sealable polypropylene film layer serving as an internal surface of said pouch, molecular orientation of said sub-biaxial oriented polypropylene film layer being parallel with said tearing direction.

2. The pouch as claimed in claim 1, characterized in that said one of heat-sealed portion has non overlapped area along an outer edge line thereof, and said two notches are formed at said non overlapped area.

3. A pouch for containing therein a content, including front and rear pouch bodies formed of a laminated film, and heat-sealed portions at confronting side edge portions of said front and rear pouch bodies for providing a fluid tight structure of said pouch, characterized in that:

said laminate film is provided with molecular orientation in one direction, and at least two notches are formed at positions close to each other at at least one of said heat-sealed portions for defining a leading end portion of a tearing zone, said notches being directed in a tearing direction parallel with a direction of said molecular orientation of said laminated film, said laminated film comprising a uniaxial polyethylene layer serving as an outer surface of said pouch, an aluminum film layer, and a casted polypropylene film layer serving as an inner surface of said pouch, molecular orientation of said uniaxial polyethylene film layer being parallel with said tearing direction.

4. A pouch for containing therein a content, including front and rear pouch bodies formed of a laminated film, and heat-sealed portions at confronting side edge portions of said front and rear pouch bodies for providing a fluid tight structure of said pouch, characterized in that:

said laminate film is provided with molecular orientation in one direction, and at least two notches are formed at positions close to each other at at least one of said heat-sealed portions for defining a leading end portion of a tearing zone, said notches being directed in a tearing direction parallel with a direction of said molecular orientation of said laminated film, said laminated film comprising a casted polypropylene film layer serving as an outer surface of said pouch, an uniaxial oriented polyethylene film layer, and a casted polypropylene film layer serving as an inner surface of said pouch, molecular orientation of said uniaxial oriented polyethylene film layer being parallel with said tearing direction.

* * * * *